H. A. W. WOOD.
MACHINE FOR CASTING AND DELIVERING CURVED STEREOTYPE PRINTING PLATES.
APPLICATION FILED SEPT. 16, 1913. RENEWED SEPT. 6, 1918.
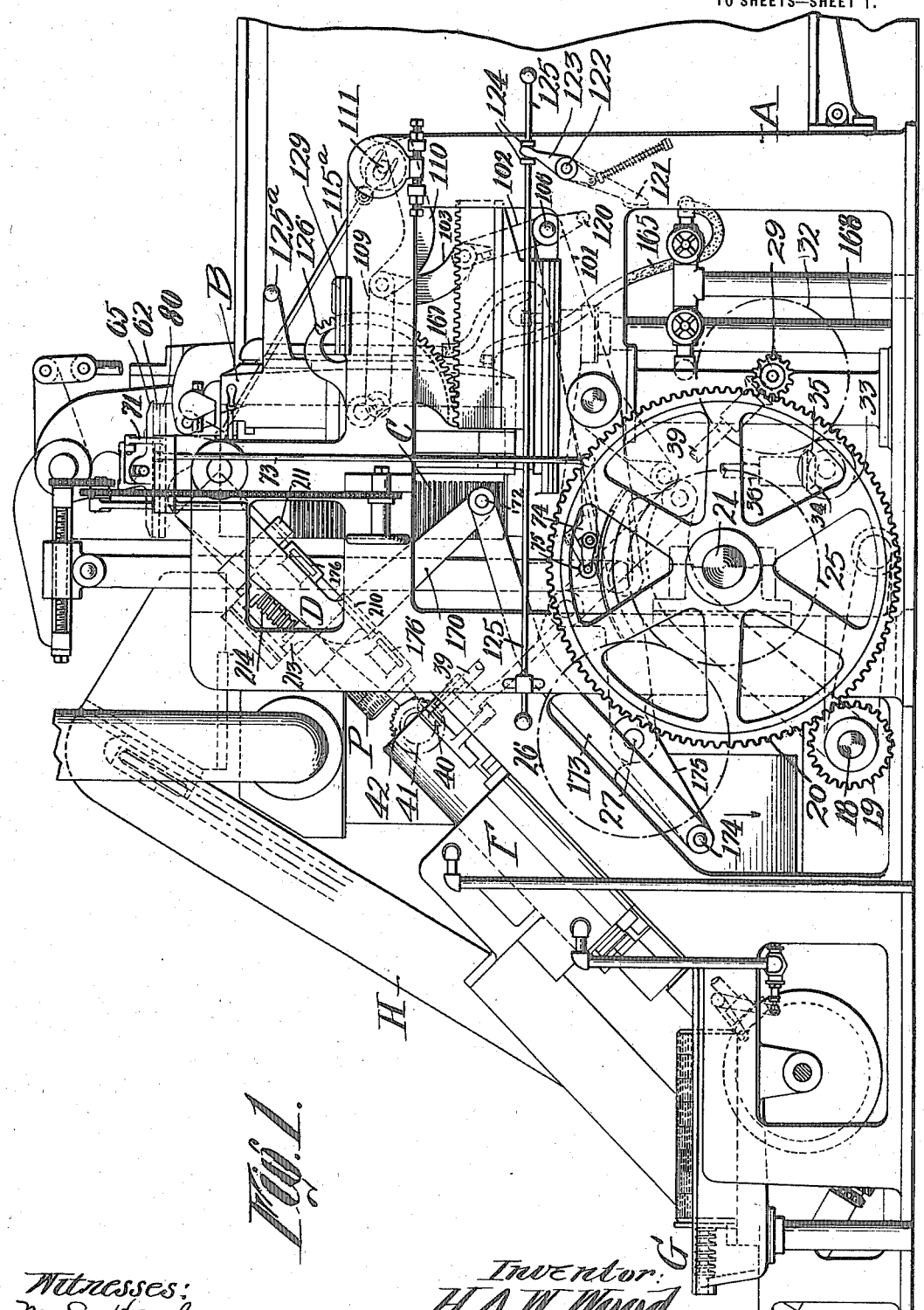

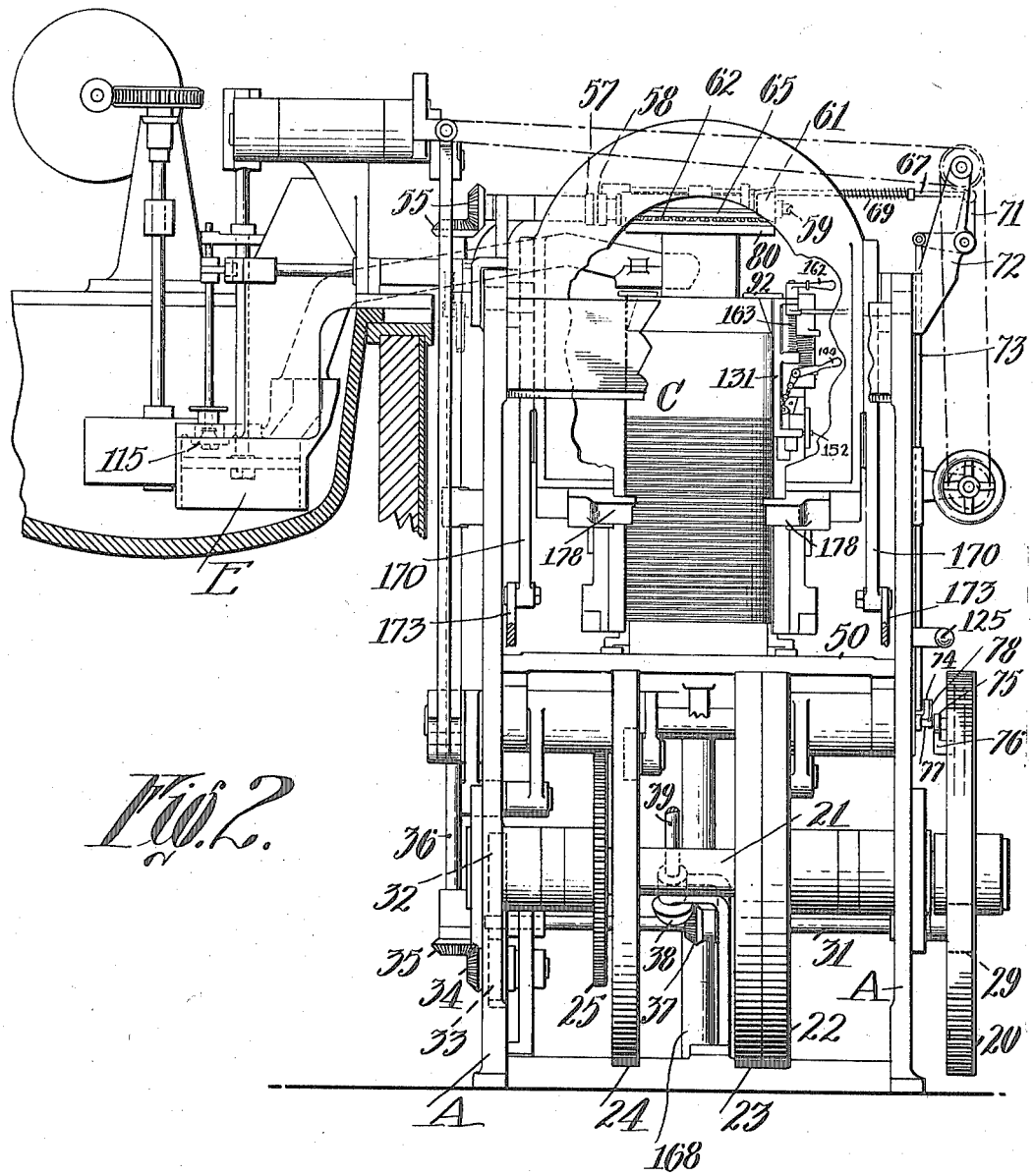

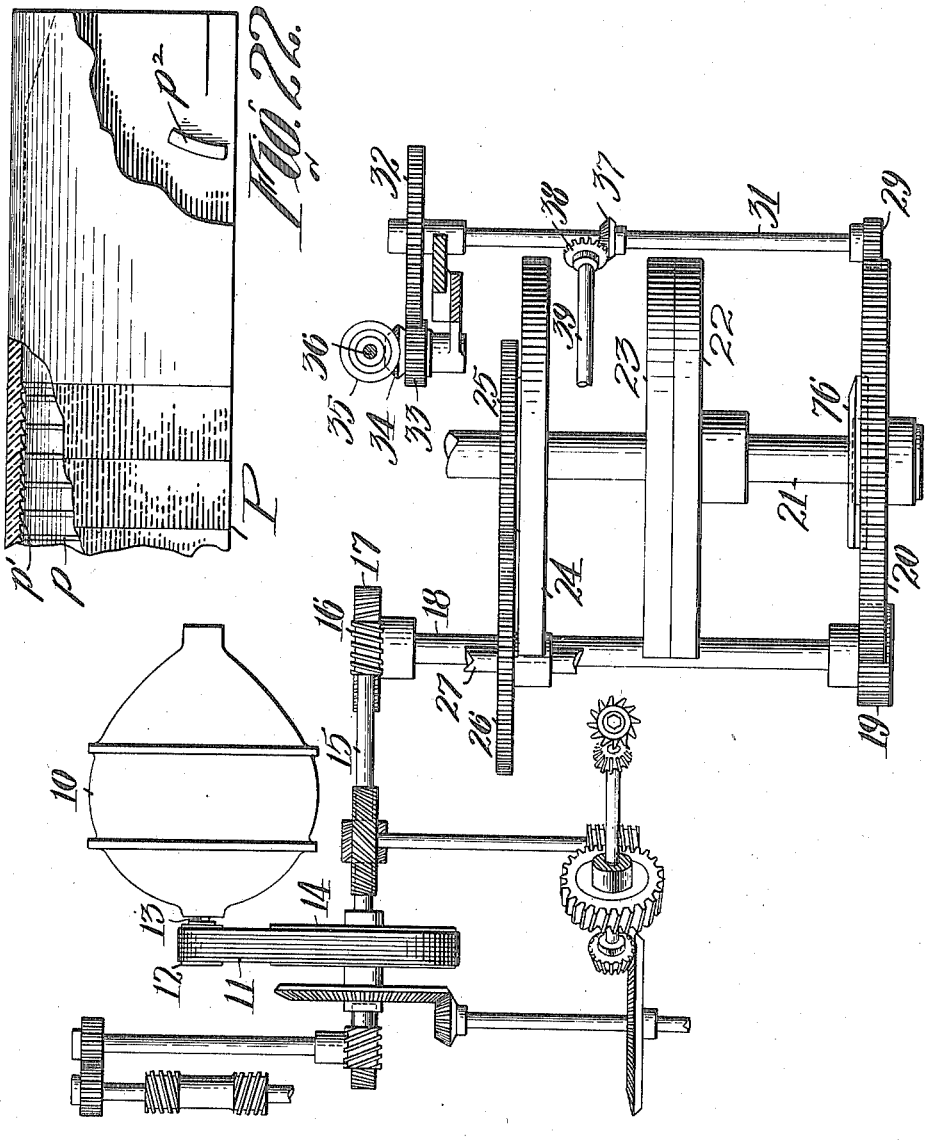

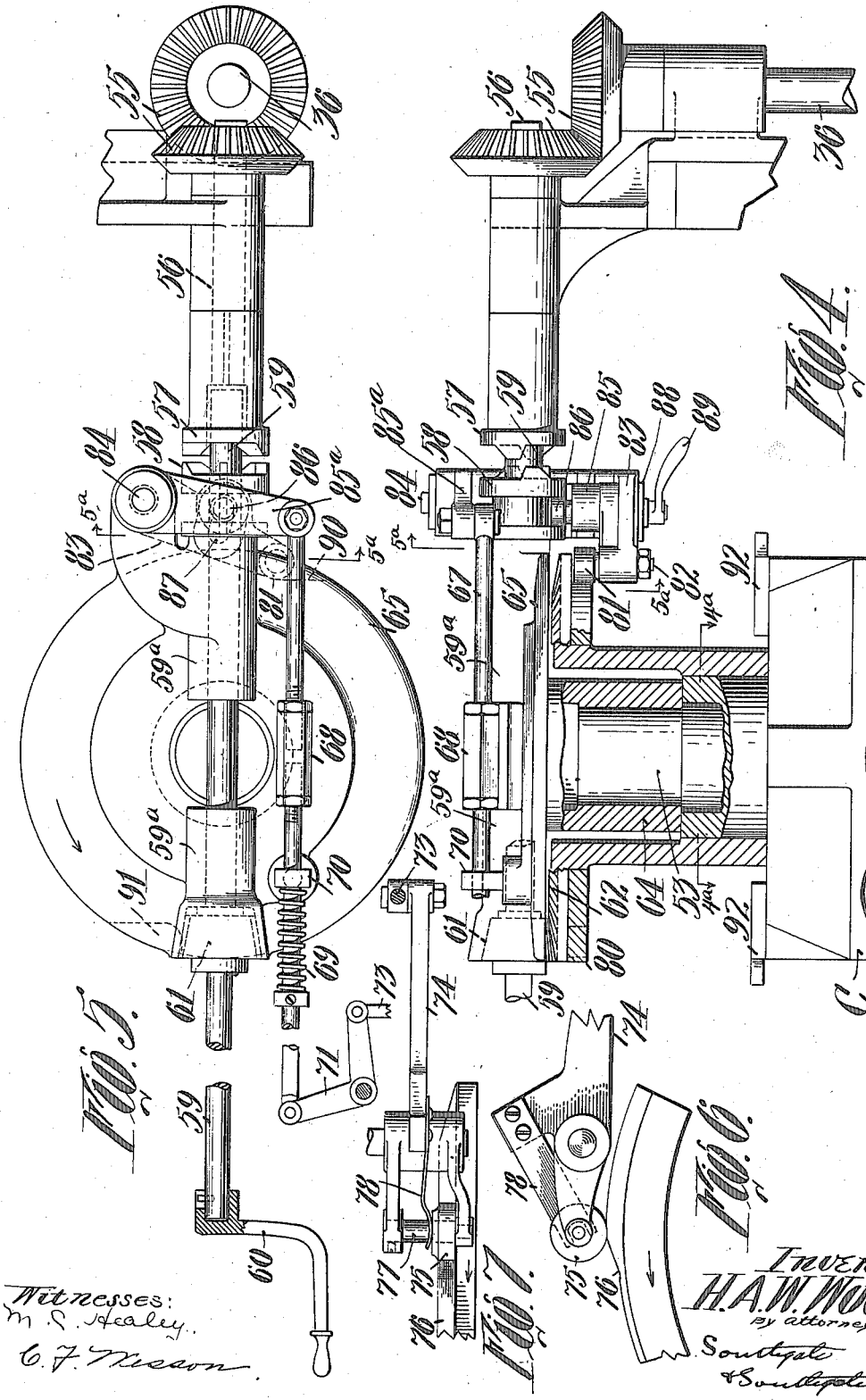

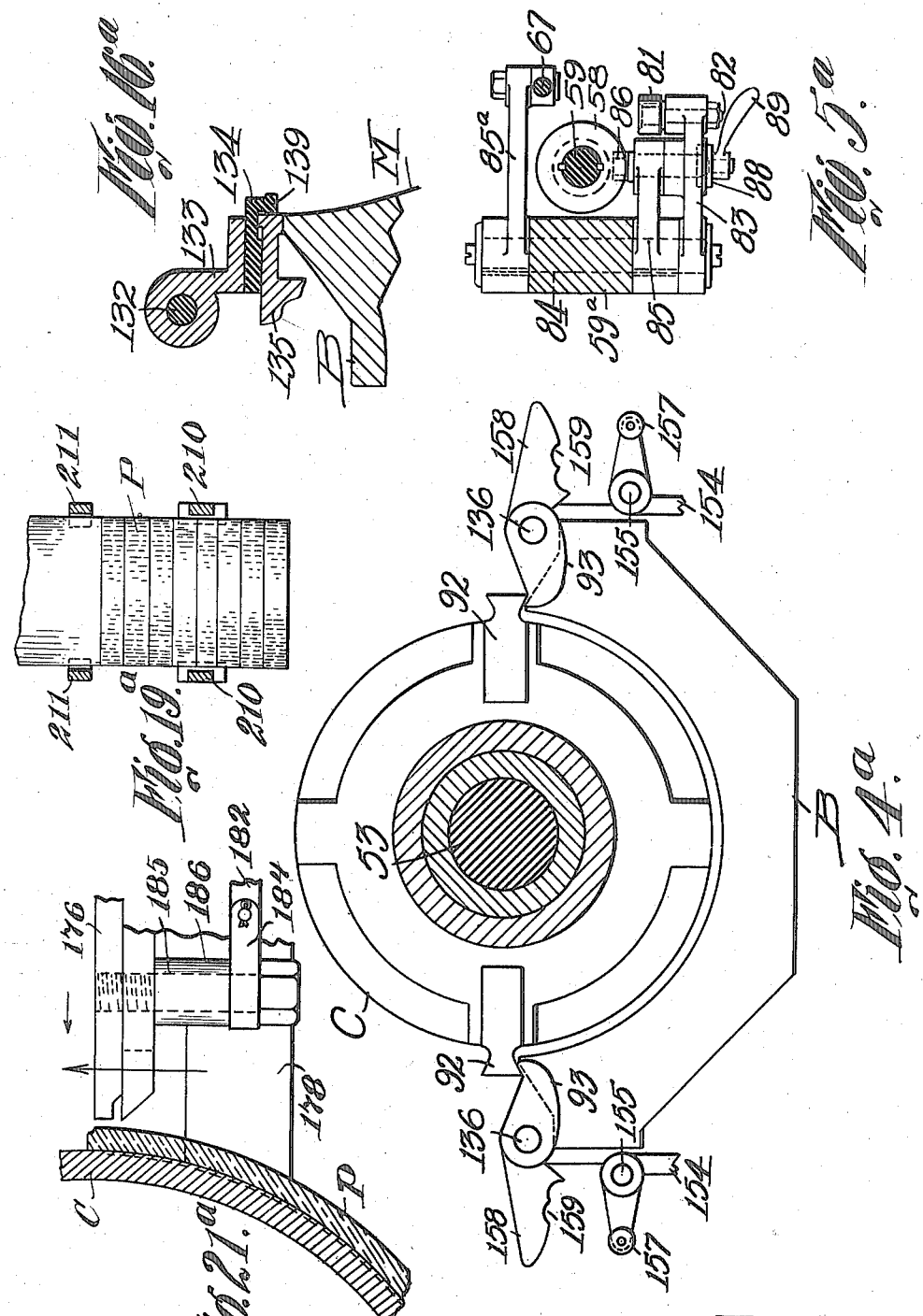

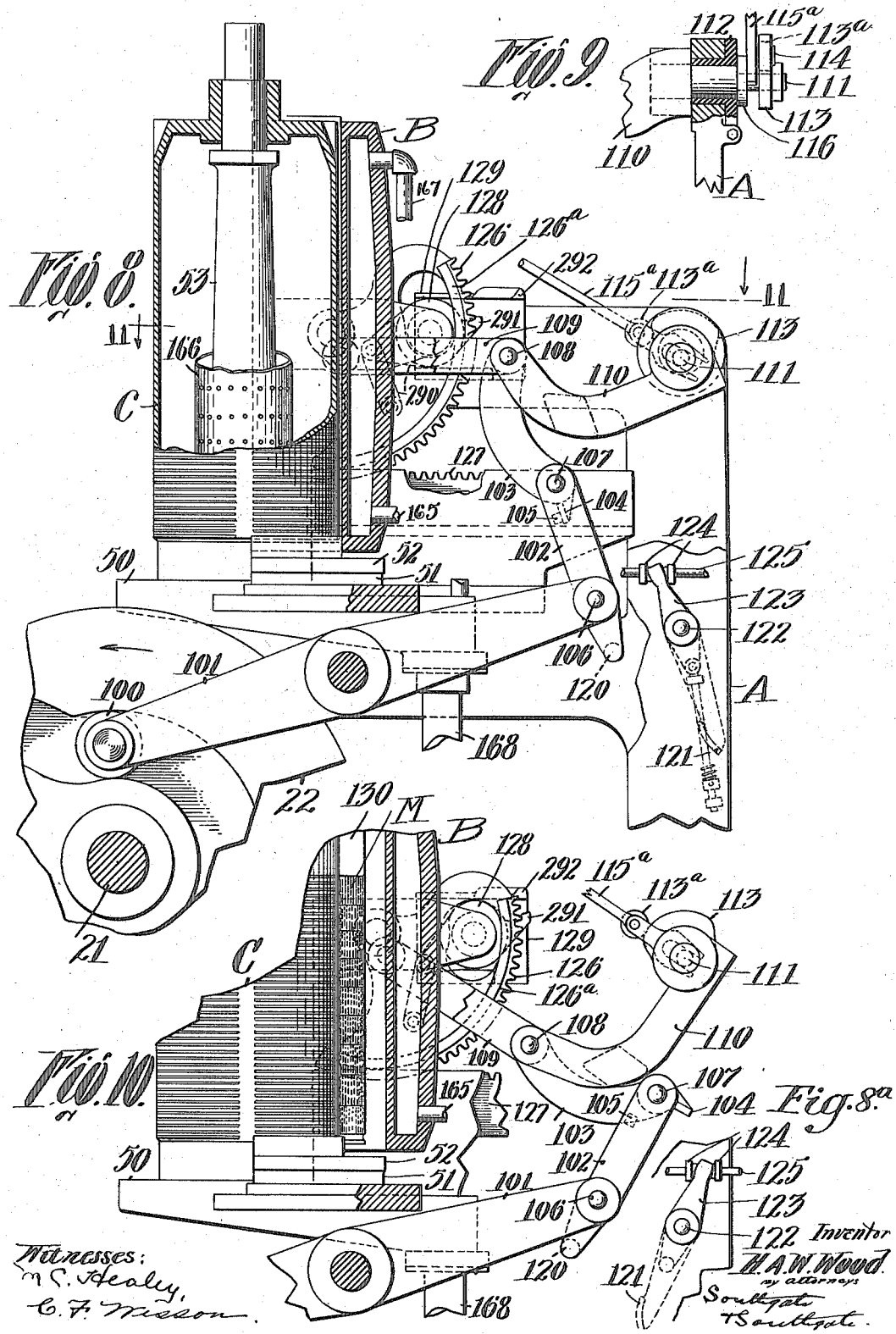

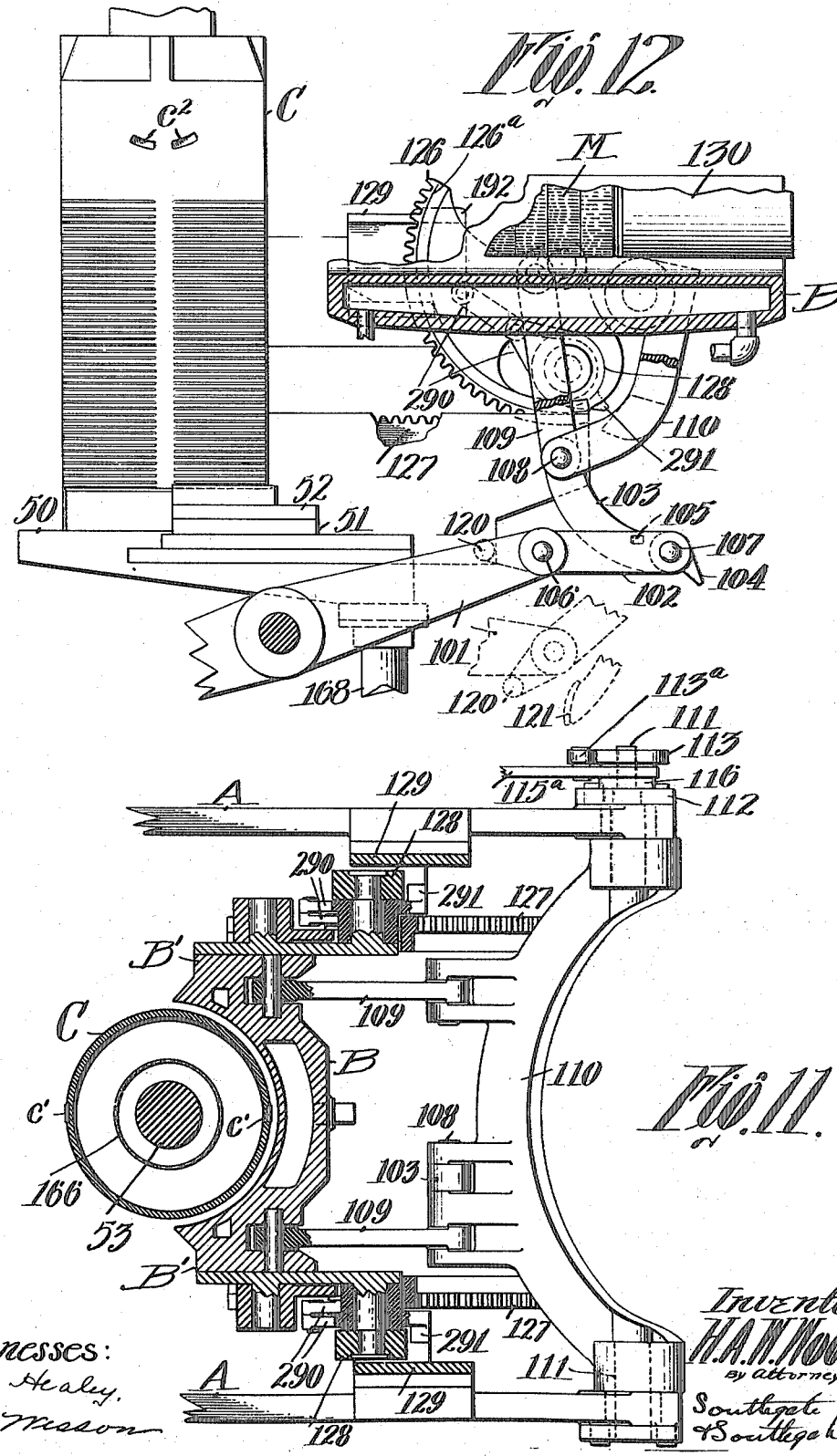

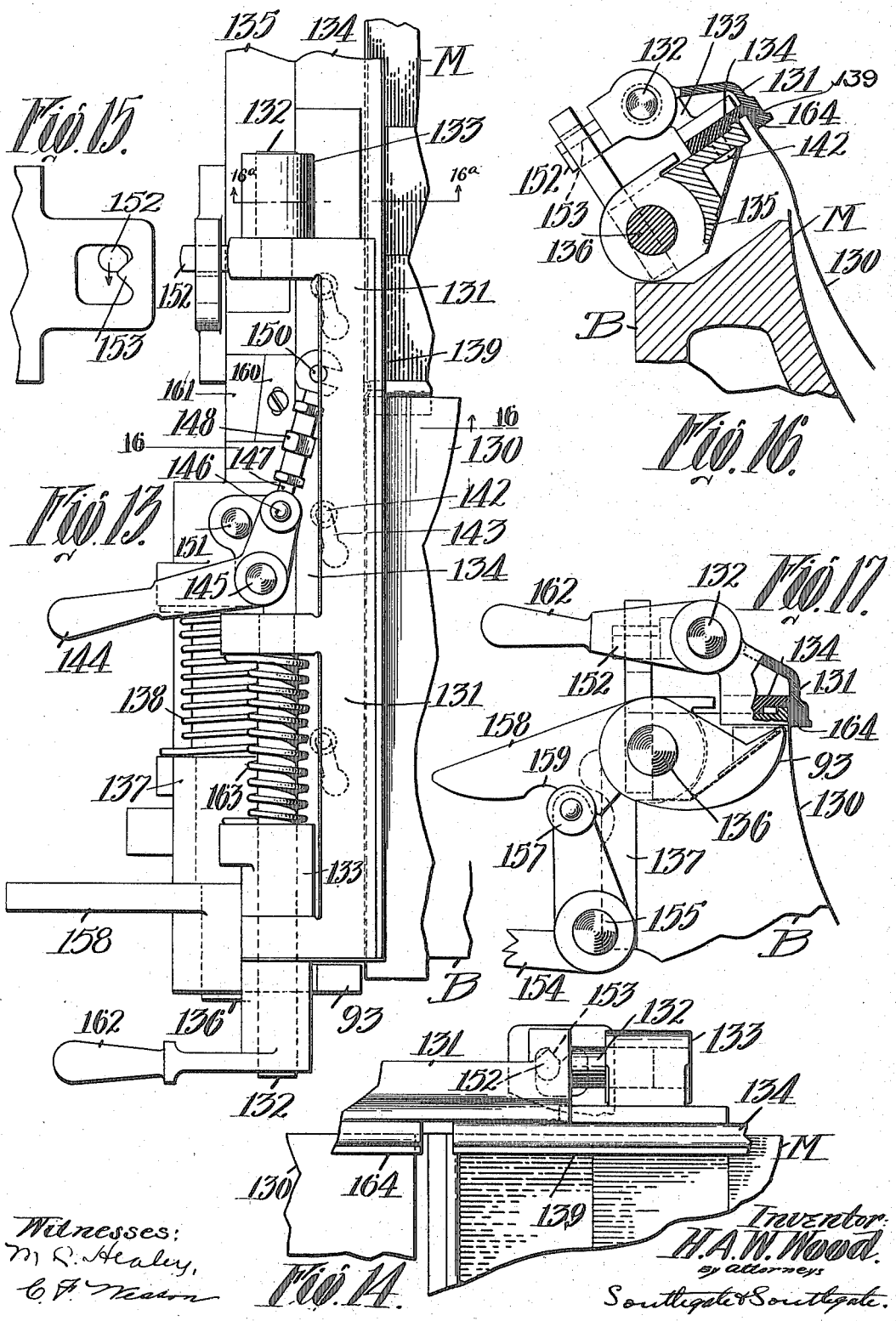

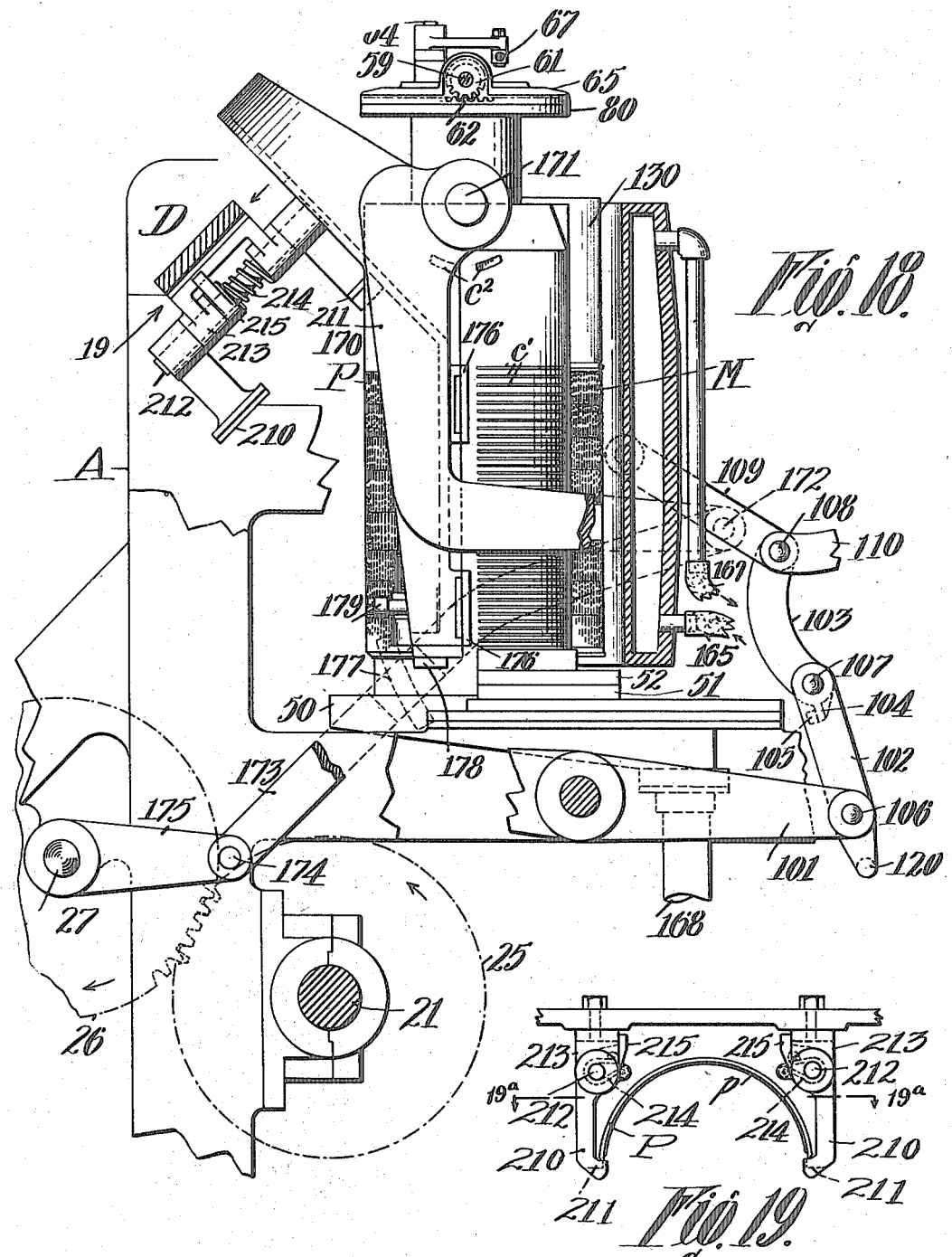

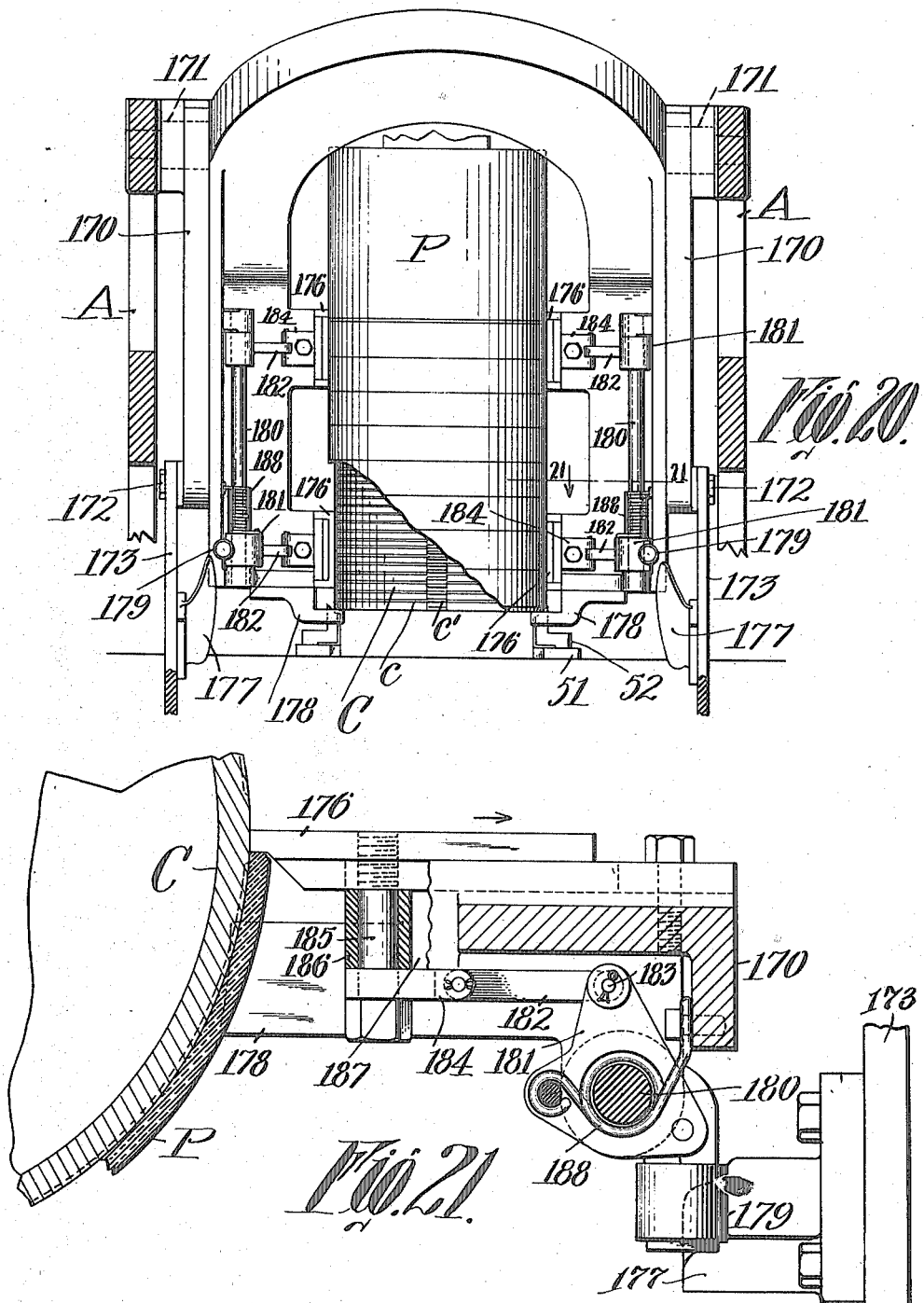

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

MACHINE FOR CASTING AND DELIVERING CURVED STEREOTYPE PRINTING-PLATES.

1,286,479.            Specification of Letters Patent.        Patented Dec. 3, 1918.

Application filed September 16, 1913, Serial No. 790,070. Renewed September 6, 1918. Serial No. 252,974.

*To all whom it may concern:*

Be it known that I, HENRY A. WISE WOOD, a citizen of the United States, residing at New York, in the county of New York and State of New York, have invented a new and useful Machine for Casting and Delivering Curved Stereotype Printing-Plates, of which the following is a specification.

This case relates to a machine for producing semi-cylindrical stereotype printing plates of the type in which the core or cylinder is provided with means on opposite sides thereof for forming the inside of the plate and in which a single back is used to coöperate therewith, but some features of the invention are capable of use with other types of casting machines.

The principal objects of this invention are to combine in one mechanism an upright casting chamber with a finishing and cooling device; to so arrange the parts that a fewer number of men will be required to operate the machine than is now necessary for similar work; to increase the convenience of inserting and removing the matrix; to facilitate the inspection of the casts during their progress through the machine; to automatically convey to the melting furnace the risers or tails as rapidly as they are removed from the casts; to economize space and time, and, more specifically, to provide a vertical casting chamber which works in conjunction with a finishing mechanism set at a different axial angle, with means between the finishing mechanism and the casting mechanism to transfer the plate axially from the vertical position to the position in which it is finished, so that all of the advantages of vertical casting and those of inclined finishing are combined in one machine.

Another substantial improvement consists in being able to swing the back of the casting box into a substantially horizontal position for the insertion and removal of mats. This, together with the automatic features of the machine, enables one man to make completely finished plates at the rate of four a minute, which has never before been possible. These plates, being cast on end with a high riser, are better than those cast in inclined position, while, as the plates pass from the casting chamber to and through the finishing mechanism by gravity, they do not require any conveying mechanism.

Further objects of the invention are to provide improved core operating means whereby the core will automatically rotate half a revolution at each operation of the machine and then stop automatically in exactly the proper position for producing another cast on the opposite side from that on which the last one was produced; to provide means whereby this automatic mechanism can be rendered inoperative and the core can be turned at will by hand or by power; to provide power operated means for positively connecting the core with the power; to provide improved means for operating the back so that when moved up to casting position against the core, it will be positively fixed in that position; to provide improved power operated means for operating the back to draw it radially away from the core to separate the matrix and the other attachments from the plate so that it can be swung to a horizontal position in a convenient location for inspection and removal of the matrix; to provide means whereby the tail sheet can be operated separately from the matrix and will be caused to occupy a curved position in the back similar to that occupied by the matrix when separated from the core and back, but free from it; and especially to provide for combining the above named features and other elements of the casting machine in such a way that they coöperate with each other and will necessarily work in the proper sequence without the expenditure of unnecessary power and also without requiring the direct supervision of the operator for each operation. The invention also involves improvements in details of construction and combinations of parts of each of the above named parts of the machine and the combination of certain of them with means for introducing molten metal into the mold and passing the plate into the finishing mechanism.

Although I have shown herein parts of the finishing, cooling, plate conveying, and pumping mechanism, they are not claimed herein by themselves but only in combination with the casting mechanism as they constitute subject matter for separate applications (Serial Nos. 790,071 and 790,072, filed September 16, 1913).

Reference is to be had to the accompanying drawings in which—

Figure 1 is a side elevation of a machine constructed in accordance with this invention;

Fig. 2 is an end view of the same with the melting pot in section;

Fig. 3 is a plan of the driving mechanism with the frame work and other parts of the machine removed;

Fig. 4 is an end elevation partly in section on enlarged scale, showing the mechanism for driving the core or cylinder of the mold;

Fig. 4$^a$ is a sectional view on the line 4$^a$—4$^a$ of Fig. 4;

Fig. 5 is a plan of that portion of the mechanism with parts in section;

Fig. 5$^a$ is a sectional view on the line 5$^a$—5$^a$ of Figs. 4 and 5;

Fig. 6 is a side elevation of a portion thereof;

Fig. 7 is a plan of the mechanism shown in Fig. 6;

Fig. 8 is a side elevation of the mechanism for operating the back showing the mold in central vertical section;

Fig. 8$^a$ is a detail of a part of the same showing the parts in another position;

Fig. 9 is a plan of certain details thereof partly in section;

Fig. 10 is a view similar to Fig. 8 showing the parts in different position;

Fig. 11 is a plan of the same parts with portions in horizontal section on the line 11—11 of Fig. 8;

Fig. 12 is a side view of the same parts showing the back swung over and removed from the core, the back and other connections appearing in section;

Fig. 13 is a plan of one corner of the back in horizontal position ready for the removal or replacing of the matrix;

Fig. 14 is a side view of a portion of the same;

Fig. 15 is a side view of a portion of the mechanism shown in Fig. 13;

Fig. 16 is a sectional view on the line 16—16 of Fig. 13;

Fig. 16$^a$ is a sectional view on the line 16$^a$—16$^a$ of Fig. 13;

Fig. 17 is an end view of the same mechanism with parts shown in section and with the elements in a different position;

Fig. 18 is a side elevation with the frame partly removed showing the mechanism for separating the cast plate from the mold;

Fig. 19 is an end view of the plate receiving means of Fig. 18;

Fig. 19$^a$ is a sectional view on the line 19$^a$—19$^a$ of Fig. 19;

Fig. 20 is an end view showing the plate removing means with parts in section;

Fig. 21 is a sectional view of the same on enlarged scale on the line 21—21 of Fig. 20; and Fig. 21$^a$ is a plan of the parts shown in Fig. 20;

Fig. 22 is a side view of the cast plate partly in longitudinal central section.

The invention is shown in the drawings in a form in which the various parts of the mechanism are mounted on a frame A. As shown, especially in Fig. 1, the mold consisting of a back B and a core C is mounted on this frame as well as a delivery device D, pump E, finishing device F, cooling device G, and elevator H for taking the tails from the finishing device and delivering them to the pump.

The power for operating the machine is shown in Fig. 3 as derived from an electric motor 10, connected to the machine by a flexible chain 11, which meshes with a pinion 12, keyed to the motor shaft 13. 14 is a driving gear meshing with the chain 11 and keyed to the main driving shaft 15 of the machine. In the complete machine the shaft 15 preferably is connected with mechanism for operating the finishing device F and elevator H.

This shaft 15 also has formed on one end a worm 16 meshing with a worm wheel 17 keyed to a shaft 18 at one end. A gear 19 is keyed to the shaft 18 at its other end; and meshes with a gear 20 keyed to a cam shaft 21 to which are keyed the back operating cam 22, tail ejector cam 23, pump cam 24, and swinging frame driving gear 25. The latter meshes with a gear 26, keyed to a crank shaft 27 for operating through suitable mechanism the delivery device D as shown in Figs. 1, and 18. A gear 29 meshes with the gear 20 and is keyed to a shaft 31 to which is keyed a gear 32, meshing with a gear 33. To this gear is attached a miter gear 34, meshing with a gear 35, keyed to a shaft 36, for operating the core as will be described.

A miter gear 37 keyed to the shaft 31 meshes with a miter gear 38, keyed to a shaft 39 and operates plate checking mechanism. On this shaft 39 is a bevel gear 40 meshing with a bevel gear 41 to which is fixed a gear 42. This gear is intended to mesh with a rack formed on the concave side of the cast plate to control its passage from the casting machine.

By reference, especially to Fig. 8, it will be seen that the frame A is provided with a platform 50 on which is mounted the usual back plate 51 which carries the casting ring 52 and the core or cylinder C extends up above the latter. On the platform 50 is formed a vertical stationary shaft 53 which has bearings at the top of the rotary cylinder C.

Referring, now to Figs. 4, 5, 6, and 7, it will be seen that the shaft 36 which, as has been stated, is operated from the shaft 31, is connected by miter gears 55 with a horizontal shaft 56 having a clutch member 57 fixed thereon. This clutch member is designed to coöperate with a clutch member 58 slidably keyed on a shaft 59. These parts are similar to those shown in my Patent No. 1,009,367, granted November 21, 1911. This shaft extends centrally across the top of the core and is provided with a handle 60 by which it can be turned when the clutch sections are not connected. The shaft 59 is also provided with a bevel pinion 61 meshing with a bevel gear 62 keyed on the top of the neck of the core. Inside this gear 62 and keyed to the vertical shaft 53 is a bushing 64 which is provided with a top plate 65 having bearings for the shaft 59. It will be seen, therefore, that the core can be rotated either by power or by hand.

For the purpose of operating the clutch, the plate 65 is provided with supports for an operating rod 67 the length of which is adjustable by means of a turn buckle 68. The rod is provided with a spring 69 operating on a puppet 70 for normally forcing the rod to the left in these figures. This rod is connected with a bell crank 71 pivoted on a bracket 72. (Fig. 2.) This bell crank is connected by a link 73 with a double-ended lever 74 shown in Figs. 2, 6 and 7. This lever carries on one end a cam roll 75 mounted in position to be engaged during the forward movement of the back by the circumference of a cam 76 mounted on the gear 20. This cam roll is held in position on a stud 77, on which it is loosely mounted, by means of a spring 78 pressing it against an arm of the lever 74. Thus the roll 75 is in position to engage with the cam 76 so that the cam can throw the clutch piece 58 into engagement with the clutch piece 57 during the ordinary forward motion of the machine to rotate the cylinder, as will be described hereinafter. The cam 76 is tapered in width at one end so that if it is desired to run the machine backward this taper engages the side of the roll 75 and pushes it to one side out of the path of the cam so as to prevent the clutch pieces from engaging during the entire reverse motion. Thus the position of the cylinder is not disturbed but it is left in position to cast when the machine is again driven forward. It is necessary to turn the machine backward only in case the operator desires to insert new shearing pins or some obstruction or break may have caused the machine to stall in the middle of an operation and it is impossible to start up under power.

Attached to the bottom of the gear 62 is a cam 80 operating a cam roll 81 loosely mounted on a stud 82 which is carried by an arm 83. This arm is loosely mounted on a shaft 84 and connected with a clutch lever 85 by means of a roll stud 86 attached to the lever 85 and passing through a slot 87 in the arm 83. The stud 86 is furnished with a suitable washer 88 and lever nut 89 for clamping the lever and arm and holding them in fixed relative position. The nut can be loosened so as to allow the arm 83 to be adjusted so as to bring the stud 86 to either end of the slot 87. Keyed to the shaft 84 is an arm 85ᵃ to which is pivoted the rod 67.

When the ordinary working adjustment is made, as shown in Fig. 5, the roll 81 is in position to enter a notch 90 formed in the edge of the cam 80, when the clutch pieces 57 and 58 are disengaged. This positively stops the cylinder C in proper position for engaging with the back B so that a plate may be cast. When the clutch piece 58 is moved to position to engage with the other clutch piece, and rotate the cylinder, the lever 83 moves in conjunction with the movable clutch piece and the lever 85 so that the roll 81 is moved out of the notch 90. Upon the engagement of the clutch pieces and the beginning of the rotation of the cylinder, the cam roll 81 contacts with the concentric portion of the cam 80 and holds the clutch piece 58 positively in engagement with the other clutch piece until the roll 81 enters a second notch 91 similar to the notch 90 and diametrically opposite. This allows the clutch piece 58 to return to disengaged position and stops the cylinder. In connection with this description it will be understood that the entrance of the roll into the notches is caused by the action of the spring 69 which always tends to perform that function.

When the stud 86 is fixed in the other end of the slot 87 the roll 81 cannot enter the notches 90 and 91 and the core C can be rotated as much as desired in either direction by hand when the clutch is open.

When the cylinder is stopped in this manner a pair of matrix clip locking cams 92—92 secured to the cylinder C are in suitable position to engage with the pair of locking levers 93 on matrix holder clip bars 136.

Some parts of the mechanism for rotating the core or cylinder are similar to a construction disclosed in my application for patent on a machine for casting, finishing and cooling stereotype plates filed October 17, 1912, Serial No. 726,239, and so much of the mechanism as is disclosed in that application is not claimed herein.

For the purpose of operating the back the following mechanism is provided: The back operating cam 22 on the shaft 21 controls a roll 100 on a lever 101. This lever is pivotally connected with a link 102 which in turn is connected with a link 103. These links constitute a toggle lever having pivots 106, 107 and 108. The link 103 is provided with a toe piece 104 adapted to engage a lug 105 on the side of the link 102 when the three pivots of the toggle are substantially in a straight line, as shown in Fig. 8. Thus any further motion in that direction is prevented. The link 103 is pivoted by a stud 108 to a link 109 which is pivoted directly to the back B. It will be understood, of course, that there are two of these links 109, one on each side of the back for operating it in a steady and accurate manner. Each of the links 109 is pivoted by the same stud 108 that has been described heretofore to a toggle yoke 110 (see Fig. 11). This yoke carries on each of its ends an oscillating shaft 111 loosely mounted in an eccentric bushing 112 rotatably carried by the frame work A. The shaft 111, being keyed to the toggle yoke 110, is operated by it to oscillate in its bearings as the back is moved by the cam 22. This shaft 111 carries a pump valve cam 113 keyed to it and operating a roll 113ª on a stud 114 carried by a connection 115ª that goes to the valve 115 of the pump. A spacing collar 116 is provided for an obvious purpose. These parts operate in conjunction with the back operating means so that the valve 115 is opened when the back starts to recede from casting position. This prevents the molten metal from being poured on the cylinder C when the parts are not in casting position.

The link 102 is provided with a projection 120 adapted to engage a spring-pressed trip lever 121 keyed to a shaft 122 loosely mounted on the frame-work A. This shaft has keyed to it a lever 123 adapted to engage between collars 124 on the trip rod 125. By moving the trip rod the trip lever 121 can be positioned at the will of the operator at any time during the cycle of operations in either of two positions, in each of which the spring holds it in place. In the position shown in Fig. 8 it cannot be engaged by the projection 120, but in the position shown in Fig. 10 it will be engaged by this projection upon each operation of the machine. In one position it prevents the movement of the back to casting position and in the other it allows it. The heel of lever 121 is intended to come in contact with the projection 120 when it is desired to bring the casting back B to a horizontal position so that a matrix may be inserted, or replaced as the case may be. When an operator desires to bring the back B to a horizontal position he need not pull the trip rod 125 into the position shown in Fig. 1. The striking of the projection 120 against the heel of the trip lever 121 causes the toggle joint to break and take the position as shown in Fig. 10, thus allowing the back B to be rocked into a horizontal position. The lever 101 oscillates continuously but does not exert any pressure on the lever 110, which remains at rest, as shown in Fig. 12, during the period in which the back B remains in a horizontal position. The trip lever 121 does not move over any farther than shown in Fig. 10 even when the toggles, etc., take the position shown in Fig. 12.

By a comparison of Figs. 8 and 10 it will be seen that in the position shown in Fig. 8 the back B is up against the core C and that for a considerable part of the revolution of the shaft 21 it will remain in this position so that the metal can be directed into the mold and allowed to set. The next action that takes place is to move the lever 101 so as to bring the back away from the core (as shown in Fig. 10). In this position the lever can exert no pressure on the toggle yoke 110. The whole back can be rocked over by a handle 125ª to a horizontal position on its segmental gears 126 which are loosely mounted on studs on the sides B' of the back.

The gears 126 have rims 126ª for supporting the weight of the back on track brackets located on the platform 50. The gears engage a pair of horizontal racks 127 mounted on the track brackets. On the studs on the back are rolls 128 engaging guide tracks 129 on the frame for keeping the back in proper position as it moves. As the back rolls rearwardly the roll 128 passes off the track 129 which is suitably formed to release it. During the first part of this motion a pair of links 290 pivoted together, one also being pivoted to the gear and one to the stud of the roller 128, tend to swing out into a straight line (Fig. 12). This prevents any further relative motion between the back and gear, and causes them to move together thereafter. One of the links 290 has a projection 291 for engaging a projection 292 on the track 129. Thus this link is swung around the stud of the roll 128 to break the toggle and allow the back to be removed to vertical position.

Referring now to Figs. 13 to 17, inclusive, the manipulation of the back for the purpose of positioning and removing the matrix M will now be described. The tail sheet 130 is attached to the tail sheet plate 131. This plate is mounted on pivoted sliding studs 132. These studs are loosely mounted in brackets 133 attached to a matrix clip plate 134. This matrix clip plate is mounted to move on a clip bar 135. This clip bar is attached to studs 136 loosely pivoted in brackets 137 attached to the back B. The clip bar 135 is provided with a torsion spring 138 coiled loosely around the pivoted stud 136 and attached to the bracket 137 at one end so that the clip bar 135, clip plate 134 mounted on it, and tail sheet plate 131, mounted on the clip plate, are normally held away from the back B by the spring. As the figures which have been referred to show only one end of one side of the back, it will be understood that the parts located at the lower end in Fig. 13 are duplicated at the other side, at the same end of the box. The clip plate 134 is formed with a projection 139 between its ends for holding the matrix firmly against the clip bar 135. On each pivoted stud 136 is a matrix locking lever 93. When the back B is in the vertical position and moved up against the core C for casting, the levers 93 will engage the matrix locking cams 92. Thus the clip bar 135 is rotated with the matrix clip plate 134, tail sheet plate 131, tail sheet 130, and matrix M into accurate position with respect to the back and cylinder for a plate to be cast.

The clip plate 134 is loosely mounted on the clip bar 135 by means of suitable studs 142 on the clip plate which engage in inclined slots 143 formed in the clip bar 135. When the matrix clip plate 134 is slid along the clip bar the former is automatically moved laterally on the clip bar by the engagement of these studs in the inclined slots. In this way the projection 139 on the clip plate releases the matrix from the clip plate and clip bar and allows the matrix to be removed from the back or a new matrix positioned therein. For the purpose of sliding the clip plate along the clip bar in this way mechanism is shown like that disclosed in my Patent No. 1,009,272 granted Nov. 21, 1911. It comprises a lever 144 pivoted on a stud 145 mounted on the clip bar 135. The lever 144 is furnished with a stud 146 for supporting a link 147 which is pivoted to it and is provided with a turn buckle 148 for adjusting it. This adjustable link is pivoted to a stud 150 attached to the clip plate 134. In Fig. 13 the mechanism is shown in a locked position with the lever 144 against a stop pin 151 mounted on the clip bar 135.

When removing the matrix from the back the levers 144 on the two sides of the back are moved to disengage them from the stop pins 151 so as to move the clip plates longitudinally. The tail sheet plates 131 move with them so that projections 152 thereon engage with stationary tail sheet cams 153 and are forced down to rotate the tail sheet plates upwardly around their pivots away from the clip plates 134. This continues until the projections 152 pass over the points of the cams 153 and then they swing back to their positions against the clip plates with the projections 152 engaging with the opposite sides of the two cams. They are thus held in the outermost position, as shown in Fig. 14, which is the position they occupy when a matrix is to be placed in the back.

A handle lever 154 is pivoted on a stud 155 mounted on the bracket 137. The lever is furnished with a loosely mounted roll 157 engaging with a cam piece 158 formed on the lever 93. This cam piece is provided with a positioning notch 159 in its face for receiving the roll so that the matrix may be held in position by the locking lever 93 as set forth in connection with Fig. 12 of my above mentioned Patent No. 1,009,272. The object of providing two notches 159 in each of the cam pieces 158 is so that the operator may easily insert the matrix. When the roll 157 engages the notch 159 farthermost away from the fulcrum 136, the clip, &c., has not been thrown into its final or casting position, but in this position allows the operator to readily slide the matrix to its proper position in the back B. The operator then brings the rolls 157 into the notches 159 which are nearest to the fulcrums 136. The clips 164 then close to casting position, causing the matrix to hug the curved surface of the casting back B. Enough freedom is provided between the clamping edges of the clips 164 and the matrix so that the latter will readily take its proper position when the clips are finally closed.

Fig. 16 shows the matrix extending beyond the edge of the back so that the clip bar 135 can be rotated around the pivot stud 136 in such a way that the clip bar engages with the matrix along the edge of the latter next to the back.

In this figure the clip plate 134 extends over the edge of the matrix with the projection 139 on the clip plate in a position to grip the matrix between the clip bar and the clip plate, when the clip plate is slid back along the clip bar and toward it, as described. When the parts are in the position shown in Fig. 13, the toggle formed by the lever 144 and link 147 is locked in such position that the clip plate bears against a wedge shaped pressure block 160. This is mounted on the clip bar 135 so that it can be adjusted along a suitable projection 161 formed thereon to regulate the pressure of the bar and of the matrix. It will be understood, of course, that the opposite edge of the matrix is locked in a similar manner by mechanism on the other side constructed in the same way.

The tail sheet 130 may be released from the outer position shown in Fig. 14 by depressing two handles 162 fixed to the studs 132 so that the projections 152 come into position to pass under the points of the cams 153. In this way the tail sheet is lifted over from contact with the back along its whole length and it forms a suitable curve of less diameter than that of the curve formed by the matrix held in the back and conforming to it. A spring 163 mounted on one of the brackets 133 and coiled on one of the studs 132 is attached to the tail sheet plate 131 on each side of the back so that the springs rotate the tail sheet plates against the clip plates and act as compression springs to slide the tail sheet toward the clip plates. In this way the projections 164 on the tail sheet plates will abut against the projections 139 on the clip plates so that the edge of the tail sheet will be located in position to overlap one edge of the matrix. Thus the edge of the matrix is held between the tail sheet and the back along its whole edge and at the same time the casting ring 52 laps over the end of the matrix a suitable distance at its lower edge and holds it against the back. Thus all the parts are in position for receiving molten metal. At this time the edges of the several plates mentioned contact with the surface of the cylinder or core C and form suitable seals at each edge.

As usual the mold is cooled by means of piping 165 for supplying water to the hollow back and a perforated tube or shell 166 mounted on the vertical shaft for receiving a cooling fluid and spraying it on the inside of the core. Drain pipes 167 and 168 are shown for the back and core respectively. The latter receives the water from channels formed in the platform 50, but not shown. The connections 165 and 167 are flexible to allow for the motion of the back.

From the description previously given, it will be understood that when the parts are in the position last described and the plate is cast, the back is moved away from the cylinder by the operation of the cam shaft 21 and the cylinder is then rotated automatically half a revolution and stopped. This first frees the matrix from the cast plate and then swings the cast plate out of the way of the back. When the back is moved away from the core as described, the cast plate P is delivered from the casting box by the mechanism shown in Figs. 18 to 21, inclusive. In the first place it may be stated that in the form shown, the cylindrical core is provided with substantially semicircular grooves $c$ on the two opposite sides for forming the usual transverse ribs $p$ on the back and that midway along these grooves the core is provided with a rack $c'$ on each side by means of which rack teeth $p'$ are cast at the highest point in the concavity of the plate for the purpose of coöperating with a suitable feeding-out gear and controlling the delivery of the plate, as I have previously set forth in my above mentioned application for patent, Serial No. 726,239. The core is also formed on each side midway between the two sets of grooves but above them with a pair of curved grooves $c^2$. These are for the purpose of casting corresponding curved projections $p^2$ on the tails of the plates for supporting and guiding the same, while the lower end is being swung away from the core.

I will now describe the mechanism which I have shown for separating the plates from the core or cylinder C. A pair of studs 171 are located on the frame A in alinement, and concentric with the grooves $c^2$. To these studs are pivoted a pair of swinging levers 170, each having a stud 172 at its end for connecting it with a link 173 which is connected by a stud 174 with a crank 175 keyed to the shaft 27.

Figs. 1 and 18 show two positions of these swinging arms. In Fig. 18 these parts are in the position which they take when the casting is to be delivered and in Fig. 1 the extreme delivering position is shown.

The arms 170, which constitute a swinging frame, are furnished with sliding plates 176 mounted in guides thereon. On each of the links 173 is a cam 177 for operating the sliding plates so that when the swinging frame is approaching the cylinder C the sliding plates 176 are pulled along and pass clear of the cast plate. When past the edge of the cast plate P, the plates 176 are released and forced in to engage with the side edges of the plate P. Then upon outward movement of the swinging frame they carry the plate P from the cylinder and swing it upwardly to a position to disengage the plate from the curved grooves $c^2$, and deliver it into the position shown in Fig. 1. This explains why the grooves $c^2$ are made concentric with the studs 171. The swinging frame (or arms) 170 is furnished at the lower end with plate support brackets 178 rigidly attached to it and formed to pass along the end of the cast plate when located on the cylinder and to support it when separated from the cylinder. Thus the cast plate is prevented from sliding down into the finishing section F of the machine until the swinging frame has receded from the high position toward the cylinder so as to remove the plate supports from the path of the cast plate.

In suitable bearings formed on the swinging frame is pivotally mounted a shaft 180. Levers 181 are keyed to it and forked to fit links 182 loosely mounted on studs 183 mounted on the levers 181. These links are connected with pieces 184 which are rigidly secured by means of studs 185 to the slides. The pieces 184 are held at a distance from the frame by distance collars 186 which are loosely mounted in slots 187 formed in the swinging frame. In this way the slide plates can slide freely away from the cylinder when the rolls 179 engage with the cams 177. When the rolls are disengaged from the cams 177 the slides move toward the cylinder and beyond the edge of the cast plate. They are actuated by torsional springs 188 attached to the swinging frame at one end coiled loosely about the shafts 180 and suitably attached at their other ends to the levers 181.

The swinging of this frame outwardly to the position shown in Fig. 1 carries the cast plate with it and delivers it to a set of intermediate tracks which are shown in Figs. 18 and 19, as well as in Fig. 1. These consist of two pairs of pivoted arms 210 and 211 which are keyed to inclined shafts 212. These shafts are loosely mounted in brackets 213 attached to the frame A. The normal position of the pivoted arms 210 and 211 is such that a plate resting on them is properly alined with the finishing section F of the machine so that a plate can slide down these tracks into the finishing section. They are held in normal position by torsional springs 214. These are loosely coiled around the shafts 212 fixed at their ends to the brackets 213, and at their opposite ends to levers 215 keyed to the shafts 212. These levers are formed to engage with the feet of the brackets 213 when turned around to the limiting position. The arms 211 are formed with feet or projections having inclined surfaces for engaging the outside surface of the tail of the plate so that when a plate P is forced toward them the convex surfaces of the tail act to separate the tracks and allow the plate to be swung in beyond these projecting feet. Then the springs force the arms in and the plate is supported at one edge on these feet. The projections on the arms 210 are of the same nature and act in the same way, but they are made shorter than the projections on the arms 211 so that they will not contact with the outside curved surface of the plate and thus mar the printing surface. They do contact with the edge of the plate after it enters between them so that the plate can be automatically left in the position shown in Fig. 19.

The operation of the machine is as follows: A man draws the back of the casting chamber toward him at the rear, when it lies before him in a horizontal position. He then inserts the mat, pushes the back, by a single move of the hand, into a vertical position, and pulls the handle which starts the casting mechanism to work. He then stands at the side of the machine, near the delivery, and, as each plate comes out of the casting chamber and runs into the finisher, it passes before his eyes. Then, as it is finished and delivered cold and dry, he merely picks it up and puts it on an elevator (not shown) which carries it to the press room. He need not concern himself with the tails as these are automatically carried back.

When the furnace needs to be replenished he merely puts old plates into the hopper of the tail carrier, which automatically carries them up and dumps them into the pot. Meanwhile the machine runs without further attention than that of inspecting and lifting off the plates, until the full quota of plates has been made. He then pushes the handle in the reverse direction, which stops the casting mechanism, walks to the rear of the machine, pulls down the casting back, removes the matrix, inserts another, and proceeds to cast as before.

From the description given, it will be seen that the various parts of the machine as herein shown and described coöperate with each other to cause the various operations to take place in the proper sequence without necessitating the direct supervision of the operator over each operation, and that the mechanism is of such form that it is effective and simple and suitable for this class of machinery, not being likely to get out of order readily when subjected to the strains that take place in casting these heavy plates.

Although I have illustrated and described only a single embodiment of the invention, I am aware of the fact that many modifications can be made therein by any person skilled in the art without departing from the scope of the invention as expressed in the claims; therefore, I do not wish to be limited to all the details of construction herein shown and described, but what I do claim is:—

1. In a machine for casting curved stereotype printing plates, the combination of a core mounted to rotate having on opposite sides thereof means for forming the insides of two plates, a shaft for rotating said core, power operated means for rotating the shaft, a clutch for connecting the power operated means with the shaft, yielding means for normally holding the clutch open, a rotary shaft, and means operated by the last named shaft for positively and periodically closing the clutch.

2. In a machine for casting curved stereotype printing plates, the combination of a core, power operated means for rotating said core, a clutch for connecting said core with the power operated means, said clutch having a movable section, a rod connected with said movable section for operating it, a spring for holding the rod in position to open the clutch, and automatic means for positively moving the rod in an opposite direction.

3. In a machine for casting curved stereotype printing plates, the combination of a core, power operated means for rotating said core, a clutch for connecting said core with the power operated means, said clutch having a movable section, a rod connected with said movable section for operating it, a spring for holding the rod in position to open the clutch, and automatic means for positively moving the rod in an opposite direction, comprising a cam having a projection, a lever, a roll on the lever in position to engage said projection, and means connected with said lever for pushing said rod against the opposition of the spring.

4. In a machine for casting curved stereotype printing plates, the combination of a core, power operated means for rotating said core, a clutch for connecting said core with the power operated means, said clutch having a movable section, a rod connected with said movable section for operating it, a lever, a cam, a roll mounted on the lever, and means whereby during part of the rotation of said cam the roll is forced out and the clutch positively closed, and whereby during the rest of the rotation of said cam said roll is prevented from closing the clutch section.

5. In a machine for casting curved stereotype printing plates, the combination of a core adapted to rotate on its own axis, power operated means for rotating said core, a clutch for connecting said core with the power operated means, said clutch having a movable section, a rod connected with said movable section for operating it, a cam having a projection provided with a slanting surface at the end thereof, a roll mounted to slide axially, a lever supporting said roll, a spring on the lever for normally holding said roll on said projecting surface, and means connected with said lever for operating said rod to close the clutch.

6. In a machine for casting curved stereotype printing plates, the combination of a core adapted to rotate on its own axis, power operated means for rotating said core, a clutch for connecting said core with the power operated means, said clutch having a movable section, a rod connected with said movable section for operating it, a spring for holding the rod in position to open the clutch, a lever, a cam having a projection provided with a slanting surface at the end thereof, a roll mounted on the lever to slide axially and freely, a spring on the lever for normally holding said roll on said projecting surface, and means connected with said lever for pushing said rod against the opposition of the spring, whereby during part of the rotation of said cam the roll is forced out and the clutch positively closed, and whereby during the rest of the rotation of said cam said roll is moved away from the projecting portion thereof and prevented from closing the clutch section.

7. In a machine for casting curved stereotype printing plates, the combination of a core having on opposite sides thereof means for forming the insides of two plates, a shaft for rotating said core, power operated means for rotating the shaft, a clutch for connecting the power operated means with the shaft, yielding means for normally holding the clutch open, positive means for closing the clutch, means for normally preventing the opening of the clutch until the core has rotated a half a revolution, and means for rendering said preventing means inoperative.

8. In a machine for casting curved stereotype printing plates, the combination of a core mounted to turn, a shaft for turning said core, means for operating said shaft by hand, means for operating said shaft by power, means for normally preventing the disconnection of said shaft from the power until the core has rotated a half of a revolution, and means for setting said preventing means in inoperative condition.

9. In a machine for casting curved stereotype printing plates, the combination of a rotary core, means for rotating the core, a movable clutch section adapted to connect the core with said means, an arm connected with said movable section for moving it, a cam rotatable with the core and having notches, an arm provided with a roller adapted to engage the edge of said cam and to enter said notches when in registration therewith, and means for setting the last named arm in two positions with respect to the first named arm, in one of which said roller presses against the cam and can enter said notches, and in the other of which said roller is held out of contact with the cam.

10. In a machine for casting curved stereotype printing plates, the combination of a rotary core, power operated means for rotating the core, a movable clutch section adapted to connect the core with said power operated means, an oscillatable arm connected with said movable section for moving it back and forth, yielding means connected with the arm for holding it in a position to keep the clutch open, a cam rotatable with the core and having two opposite notches, an arm provided with a roller adapted to engage the edge of said cam and to enter said notches when in registration therewith, and means for setting the last named arm in two positions with respect to the first named arm, in one of which said roller presses against the cam and can enter said notches, and in the other of which said roller is held out of contact with the cam.

11. In a machine for casting curved stereotype printing plates, the combination of a core mounted to rotate having on the opposite sides thereof means forming the insides of two plates, a shaft for rotating said core, a clutch for controlling the operation of the shaft, yielding means for normally holding the clutch open, a rotary shaft, and means operated by said rotary shaft for periodically closing the clutch.

12. In a machine for casting curved stereotype printing plates, the combination of a cylindrical core having means for casting plates on opposite sides thereof, with a rotary shaft, a segmental back coöperating with said core, means operated by said shaft for moving said back up against the core to form a complete mold for receiving the cast metal, means for then moving said back with the matrix radially away from the core, means operated by said shaft for then revolving the core half a revolution to turn the plate out of the back, stopping the core, and registering it accurately in position, and means for continuing the motion of the back and turning it over into horizontal position.

13. In a machine for casting curved stereotype printing plates, the combination with a core, of a vertical segmental back coöperating therewith, a toggle yoke mounted to oscillate, a link pivoted to said toggle yoke and to said back, whereby the link and yoke constitute a toggle to hold the back against the core, and power operated means connected with the pivot between said toggle yoke and link for breaking the toggle-joint, and thus moving the back away from the core.

14. In a machine for casting curved stereotype printing plates, the combination with a frame, of a core thereon, a segmental back coöperating therewith, a toggle connected with said frame and with said back, to hold the back against the core, power operated means connected with the central joint of said toggle for pulling the central joint down, and thus moving the back from the core, and means whereby when said joint has been moved a certain distance, the further motion thereof in substantially the same direction will cause the back to swing over into horizontal position.

15. In a machine for casting curved stereotype printing plates, the combination with a core, of a vertical segmental back coöperating therewith, a toggle connected with said back to hold the back against the core, and a second toggle, consisting of two links pivoted together and one of them pivoted to the first named toggle near the central joint thereof for operating it, the first named toggle having its three pivots substantially in alinement when the back is in casting position.

16. In a machine for casting curved stereotype printing plates, the combination with a core, of a vertical segmental back coöperating therewith, a toggle connected with said back to hold the back against the core, and means connected with the toggle for pulling the central joint thereof down and thus moving the back, the last named means comprising a second toggle, consisting of two links pivoted together and one of them pivoted to the first named toggle near the joint thereof, both toggles having their three pivots substantially in alinement when the back is in casting position.

17. In a machine for casting curved stereotype printing plates, the combination with a core, of a vertical segmental back coöperating therewith, a toggle connected with said back to hold the back against the core, power operated means connected with the central joint of said toggle for breaking the toggle, pulling the point of connection down and thus moving the back, said means comprising a second toggle consisting of two links pivoted together and one of them pivoted to the first named toggle near the central joint thereof, the second toggle constituting means for preventing the central joint of the first toggle going beyond the center and having means upon it for preventing the central joint of the second toggle from going beyond its center.

18. In a machine for casting curved stereotype printing plates, the combination with a vertical core, of a segmental back adapted to coöperate therewith, a system of toggles for locking said back against the core and moving it away therefrom, a pair of rockers with which the back is movably connected and adapted to move away from the core, and means connecting said rockers and back for preventing relative motion between them after the back has moved a short distance away from the core.

19. In a machine for casting curved stereotype printing plates, the combination with a core, of a segmental back adapted to coöperate therewith, a pair of rockers on which the back is adapted to move away from the core, said back being movable relatively to the rockers, and means connecting said rockers and back for preventing relative motion between them after the back has moved a short distance away from the core, whereby the further rearward motion of the back will cause it to swing on the rockers.

20. In a machine for casting curved stereotype printing plates, the combination with a core, of a segmental back adapted to coöperate therewith, means for locking said back against the core and moving it away therefrom, a pair of rockers on which the back is adapted to move away from the core, and a pair of links pivoted together, one being pivoted to said back and the other to one of said rockers, whereby after said links are in alinement with each other the further rearward motion of the back will cause it to swing on the rockers.

21. In a machine for casting curved stereotype printing plates, the combination of a segmental back, power operated means for moving said back rearwardly, a link pivoted to said back, a second link pivoted to the first link, a rocker to which the second link is pivoted, a horizontal rack on which the rocker is adapted to turn, said back being movable along the rocker until said links come into a straight line, whereby the further motion of the back rearwardly can take place only by turning it with the rocker.

22. In a machine for casting curved stereotype printing plates, the combination of a vertical core, a segmental back means connected with said back for moving it back and forth, a pair of side plates on the back fixed to it, two studs extending outwardly from each side plate, a pair of rockers pivotally connected with one pair of studs and adapted to support the back, a pair of links pivoted to the other pair of studs, and a second pair of links pivoted to the ends of the first named links and to the rockers.

23. In a machine for casting curved stereotype printing plates, the combination of a core, a back, means connected with said back for moving it back and forth, two studs extending outwardly from each side of the back, a pair of rockers pivotally connected with one pair of studs and adapted to support the back, a track supporting said rockers, a pair of links pivoted to the other pair of studs, and a second pair of links pivoted to the ends of the first named links and to the rockers, the first named links having projections thereon, and the track also having projections in position to be engaged by the first named projections when the back has been moved from the horizontal toward the vertical position.

24. In a machine for casting curved stereotype printing plates, the combination of a core, a back, mechanism for moving said back toward and from the core, said mechanism having a projection thereon, a trip lever, and yielding means for holding said trip lever in either one of two positions, in one of which it is in the path of said projection to prevent the commencement of the motion of the back toward the core.

25. In a machine for casting curved stereotype printing plates, the combination of a vertical back, toggle mechanism for moving said back horizontally, said toggle mechanism having a projection thereon, a trip lever, means for holding said trip lever in either one of two positions, in one of which it is in the path of said projection to prevent the commencement of the reverse motion of the back, and a trip rod operating said trip lever.

26. In a machine for casting stereotype printing plates, the combination of a movable back forming part of a casting mold, a toggle yoke connected with said back for moving it, means for swinging the toggle yoke about a pivot, a pump for supplying metal having a valve constituting means for preventing the discharge of metal by the pump when the valve is open, and means operated by said yoke for opening said valve when the back starts to recede from casting position.

27. In a machine for casting stereotype printing plates, the combination of a movable back, a shaft movable therewith, a cam on said shaft, a pump, a valve in said pump which, when open, prevents the discharge of metal by the pump, and means operated by said cam for opening and closing the valve.

28. In a machine for casting stereotype printing plates, the combination of a movable back, a pivoted member for operating the back, a shaft movable therewith, eccentric bushings in which said shaft is mounted to turn, a cam on said shaft, a pump, a valve in said pump which, when open, prevents the discharge of metal by the pump, and means operated by said cam for opening and closing the valve.

29. In a mold for casting stereotype printing plates, the combination with a segmental back, of a clip bar pivoted on said back, a clip plate mounted on the clip bar and movable with respect thereto for clamping a matrix to the clip bar, and a tail sheet plate pivoted on said clip plate and capable of swinging independently thereof for holding a tail sheet.

30. In a mold for casting curved stereotype printing plates, the combination with a curved back, of means movably mounted thereon for clamping a matrix in position therein at the edges, a movable tail sheet plate for holding the tail sheet, and means for moving said tail sheet plate with respect to the matrix clamping means.

31. In a mold for casting curved stereotype printing plates, the combination with a curved back, of movable matrix clamping means at the edges thereof, tail sheet plates movable with the matrix clamping means and having projections thereon, and stationary tail sheet cams in position to be engaged by said projections as the tail sheet plates move to force said tail sheet plates away from the matrix clamping means during said motion of the matrix clamping means.

32. In a mold for casting curved stereotype printing plates, the combination with a curved back, of matrix clamping means at the edges thereof, movable longitudinally, tail sheet plates movable longitudinally with the matrix clamping means and having projections thereon, and tail sheet cams in position to be engaged by said projections as the tail sheet plates move to force said tail sheet plates away from the matrix clamping means during said motion of the matrix clamping means, and thereafter allow them to move back into a position to hold the tail sheet against the back.

33. In a mold for casting curved stereotype printing plates, the combination with a curved back, of matrix clamping means at the edges thereof, movable longitudinally, tail sheet plates movable longitudinally with the matrix clamping means and having projections thereon, stationary tail sheet cams in position to be engaged by said projections as the tail sheet plates move to force said tail sheet plates away from the matrix clamping means during said motion of the matrix clamping means, and springs for swinging the tail sheet plates against the matrix clamping means and sliding them longitudinally.

34. In a machine for casting curved stereotype printing plates, the combination of a core, a back, means for moving the back away from the core, means for then rotating the core to swing the plate cast thereon outwardly from the back, and means for then swinging a plate bodily from the face of said core on an axis located at the end of the core and bringing the plate into inclined position.

35. In a machine for casting curved stereotype printing plates, the combination of a vertical core, a back, means for moving the back away from the core, means for then rotating the core on its own axis to swing the plate cast thereon outwardly from the back, and means for then swinging said plate bodily from the face of said core on a horizontal axis located at the top of the core and bringing the plate into inclined position.

36. In a machine for casting curved stereotype printing plates, the combination of an upright core, and means for swinging a plate bodily from the face of said core on an axis located at the upper end of the core and bringing the plate into inclined position.

37. In a machine for casting curved stereotype printing plates, the combination with a core mounted to turn on a vertical axis, and means for swinging a plate bodily and radially from the core about a transverse axis at the end thereof and holding it at a distance therefrom.

38. In a machine for casting curved stereotype printing plates, the combination with a core mounted to turn on a vertical axis, and means for moving a plate bodily from the core and holding it in a position at an inclination to said axis.

39. In a machine for casting curved stereotype printing plates, the combination with a vertical convex core and a back, of means for taking a cast plate from the core independently of the back and swinging it into an inclined position through an angle of less than 90 degrees.

40. In a machine for casting curved stereotype printing plates, the combination with a vertical casting chamber and a pair of inclined tracks for supporting a plate, of means between the chamber and tracks for swinging a plate out from the bottom to a position between the tracks.

41. In a machine for casting stereotype printing plates, the combination with a vertical casting chamber, of means adjacent thereto for swinging a cast plate from the vertical position in which it is cast through a single angle about an axis at one end of the plate to an inclined position ready to be finished.

42. In a machine for making stereotype printing plates, the combination with a vertical casting chamber, of a supporting mechanism arranged at a small angle thereto, and means between the casting chamber and supporting mechanism for swinging a cast plate about an axis at one end thereof from the vertical position in which it is cast to the position in which it is to be supported.

43. In a machine for making stereotype printing plates, the combination with a vertical casting chamber, of a finishing mechanism arranged at an inclination, and means between the casting chamber and finishing mechanism for swinging a cast plate by a single motion from the vertical position in which it is cast to the position in which it is to be finished in the finishing mechanism.

44. In a machine for making curved stereotype printing plates, the combination with a vertical casting chamber, of an inclined finishing device, inclined tracks in position to feed a plate therefrom to the finishing device, and means between the tracks and casting chamber for transferring a cast plate from its vertical position in the casting chamber to an inclined position on the tracks.

45. The combination with a back and core for casting a stereotype printing plate, of a frame adjacent thereto having means thereon for engaging a plate, and means for moving said frame, with a plate thereon independently of the back, away from said core through a small angle to an inclined position.

46. In a machine for casting curved stereotype printing plates, the combination of a vertical core, a transverse stud at the top of said core, and means pivoted on said stud for swinging a cast plate away from the core.

47. In a machine for casting curved stereotype printing plates, the combination of a vertical core, transverse studs at the top of said core, and a pair of arms pivoted on said studs for swinging a cast plate away from the core, said arms having means thereon for supporting the cast plates.

48. In a machine for casting curved stereotype printing plates, the combination of a vertical core rotatable on its own axis, a transverse stud at the top of said core, said core having curved grooves therein concentric with said stud for casting projections on the inside of the plate, and means pivoted on said stud for swinging a cast plate away from the core whereby the projections on the cast plate will swing along said grooves in the core.

49. In a machine for casting curved stereootype printing plates, the combination of a vertical core rotatable on its own axis, transverse studs at the top of said core, said core having curved grooves therein concentric with said studs for casting projections on the inside of the plate, and a pair of arms pivoted on said studs for swinging a cast plate away from the core whereby the projections on the cast plate will swing along said grooves in the core, said arms having means thereon for supporting the cast plates.

50. In a device for delivering curved stereotype printing plates, the combination of a convex core, a pair of arms pivoted at the upper end of said core and having inwardly extending projections for engaging the opposite ends of the plate and supporting the same, means carried by said arms for engaging the longitudinal edges of the plate, and means for swinging said arms away from the core to deliver a plate.

51. In a device for delivering curved stereotype printing plates, the combination of a vertical convex core, a pair of arms pivoted at the top of the core and having inwardly extending projections at their lower ends for engaging the bottom of a plate on the core, and sliding plates on said arms for engaging the vertical edges of the cast plate while on the core.

52. In a device for delivering curved stereotype printing plates, the combination of a convex core, a pair of arms pivoted at the end of the core and having inwardly extending projections at their opposite ends for engaging the end of a plate on the core, sliding plates on said arms for engaging the longitudinal edges of the cast plate while on the core, and positive means for swinging said arms outwardly from the core, whereby a plate thereon will be supported by said projections and forced at its edges from the core by said plates.

53. In a device for delivering curved stereotype printing plates, the combination with a convex core, of a frame pivoted to swing outwardly from said core, and radially sliding plates thereon adapted to engage the longitudinal edges of a cast plate for detaching the same from the core.

54. In a device for delivering curved stereotype printing plates, the combination with a convex core, of a frame pivoted to swing outwardly from said core, radially sliding plates thereon adapted to engage the longitudinal edges of a cast plate for detaching the same from the core, a spring-pressed shaft on the frame, having an arm projecting therefrom, means connected with said arm for operating a sliding plate, and means whereby during the motion of said frame, said shaft and arm will be turned on the axis of the shaft.

55. In a machine for delivering stereotype printing plates, the combination with a core, of a swinging frame, a shaft on said frame having an arm thereon, a link connected with said arm, a plate connected with said link to be operated thereby, and guides on said frame for said plate.

56. In a machine for delivering stereotype printing plates, the combination with a core, of a swinging frame, a shaft on said frame having an arm thereon, a link connected with said arm, a plate connected with said link to be operated thereby, a cam roller on said shaft, a link connected with said frame, means for swinging the last named link to operate the frame, and a cam on the link for engaging said cam roller and operating it during the motion of the link.

57. In a device for delivering curved stereotype printing plates, the combination with a core, of a swinging frame located adjacent thereto, a shaft, a link connected with said frame and operated by said shaft, a sliding plate on the frame, means on the link for causing the sliding plate to move downwardly as the frame approaches the core and to be released when the frame is moved beyond the edges of the plate on the core.

58. In a device for delivering curved stereotype printing plates, the combination with a core, of a swinging frame located adjacent thereto, a shaft, a link connected with said frame, and operated by said shaft, a cam on said link, a sliding plate on the frame, a cam roller connected with said sliding plate and in position to be engaged by said cam, and a spring normally tending to slide the plate inwardly against the core when the roller is not engaged by the cam, whereby upon the movement of the swinging frame outwardly said plate will engage the edge of the cast plate and swing it away from the core.

59. In a stereotype plate casting machine, the combination with a vertical core, and a segmental back movable toward and from it, of means for turning the core to deliver a cast plate away from the back, a swinging frame adapted to engage the plate and swing it away from the core to an inclined position, an inclined track in position to receive the plate from the said frame.

60. In a machine for casting curved stereotype printing plates the combination with a vertical cylindrical core, and a back movable toward and from it, of a shaft, means operated by said shaft for moving the back, means operated by said shaft for swinging the core through a half a revolution after the back has been withdrawn to bring the cast plate to the outside of the mold, means operated by said shaft for swinging the cast plate away from the core about a transverse axis at the top of the core, and an inclined track in alinement with said axis in position for receiving the cast plate.

61. In a device for delivering cast stereotype printing plates, the combination with a core, of a frame mounted to swing toward and from the core at the bottom, means carried by said frame for engaging a cast plate on the core and swinging it away from the core with the frame, and a pair of inclined tracks in position over the frame to receive the plate from the frame.

62. In a device for delivering cast stereotype printing plates, the combination with a core, of a frame mounted to swing toward and from the core, means carried by said frame for engaging a cast plate on the core and swinging it away from the core with the frame, and a pair of tracks in position to receive the plate from the frame, the axis on which the frame swings being in alinement with said tracks and also with the edge of a plate when in position on the core.

63. In a device for delivering curved stereotype printing plates, the combination with a core, of a frame mounted to swing toward and from the core, means carried by said frame for engaging a cast plate on the core and swinging it away from the core with the frame, and a pair of tracks in position to receive the plate from the frame, said tracks being yieldingly mounted and having inclined edges, whereby when the plate moves between them the tracks are forced outwardly by the plate.

64. In a machine for delivering curved stereotype printing plates, the combination with a movable frame for carrying the plates from the mold, of a pair of pivoted tracks in position to be engaged by the plate as it is moved toward them, said tracks having inclined edges for causing them to be forced outwardly by the plate, and springs for swinging said tracks inwardly after the plate has passed between them.

65. In a machine for delivering cast curved stereotype printing plates, the combination of a frame for moving the plates from the mold, two sets of pivoted arms, each having feet projecting toward each other and provided with inclined outer surfaces for engaging a plate whereby as the convex side of the plate is forced between said feet, the feet will be caused to move outwardly, springs for swinging said arms inwardly when the plate has passed beyond the feet, and means for limiting the inward motion of the arms.

66. In a machine for delivering cast curved stereotype printing plates, the combination of a frame for moving a plate, two sets of pivoted arms, having feet projecting toward each other and provided with inclined outer surfaces for engaging the plate, whereby as the convex side of the plate is forced between said feet, the feet will be caused to move outwardly, springs for swinging said arms inwardly when the plate has passed beyond the feet, two of said feet being in position to engage the tail of the plate and the others in position to pass over the type surface, the latter feet being shorter than the former so that they will not mar the printing surface.

67. In a stereotype plate casting machine, the combination with a vertical core, and a segmental back movable toward and from it, of means for turning the core to deliver a cast plate away from the back, a swinging frame adapted to engage the plate and swing it away from the core to an inclined position, an inclined track in position to receive the plate from the said frame, and a finishing mechanism in alinement with said track.

68. In a machine for casting curved stereotype printing plates, the combination with a vertical cylindrical core, and a back movable toward and from it, of a shaft, means operated by said shaft for moving the back, means operated by said shaft for swinging the core through a half a revolution after the back has been withdrawn to bring the cast plate to the outside of the mold, means operated by said shaft for swinging the cast plate away from the core about a transverse axis at the top of the core, an inclined track in alinement with said axis in position for receiving the cast plate, a finishing mechanism in alinement with said track, and means operated by said shaft for operating the finishing mechanism.

69. In a machine for casting curved stereotype printing plates, the combination of a core mounted to turn on a vertical axis, a back, and means independent of the back for swinging a plate bodily from the core and presenting it in position to be delivered downwardly therefrom.

In testimony whereof I have hereunto set my hand, in the presence of two subscribing witnesses.

HENRY A. WISE WOOD.

Witnesses:
B. N. STOEBER,
LILLIAN C. JONES.